(12) United States Patent
Bennah et al.

(10) Patent No.: US 9,219,997 B2
(45) Date of Patent: Dec. 22, 2015

(54) MANAGING SERVICE SUBSCRIPTIONS OVER A UNIDIRECTIONAL TRANSMISSION CHANNEL

(71) Applicant: LENOVO ENTERPRISE SOLUTIONS (SINGAPORE) PTE. LTD., Singapore (SG)

(72) Inventors: Albert D. Bennah, Cary, NC (US); William J. Piazza, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 14/062,485

(22) Filed: Oct. 24, 2013

(65) Prior Publication Data
US 2015/0118952 A1  Apr. 30, 2015

(51) Int. Cl.
| | | |
|---|---|---|
| *H04W 4/00* | (2009.01) | |
| *H04W 4/08* | (2009.01) | |
| *H04B 7/185* | (2006.01) | |
| *H04W 4/20* | (2009.01) | |

(52) U.S. Cl.
CPC ............. *H04W 4/08* (2013.01); *H04B 7/18539* (2013.01); *H04W 4/206* (2013.01)

(58) Field of Classification Search
USPC ......... 455/426.1, 517, 3.01, 132, 3.04, 152.1, 455/345, 466, 422, 414, 509, 411, 528, 455/428; 370/401, 236.2, 252, 235.1, 370/230.1; 709/217, 204, 206, 203, 226, 709/232–235
See application file for complete search history.

(56) References Cited

U.S. PATENT DOCUMENTS

| | | | |
|---|---|---|---|
| 5,553,315 A | * | 9/1996 | Sobti et al. ..................... 455/509 |
| 6,112,085 A | * | 8/2000 | Garner et al. .................. 455/428 |
| 7,356,304 B2 | | 4/2008 | Zoeckler |
| 7,613,435 B2 | | 11/2009 | Reynolds et al. |
| 7,941,503 B2 | | 5/2011 | Benco et al. |
| 8,019,298 B2 | * | 9/2011 | Reynolds et al. .......... 455/152.1 |
| 8,184,647 B2 | | 5/2012 | Gupta et al. |
| 2002/0037716 A1 | * | 3/2002 | McKenna et al. ............. 455/422 |

(Continued)

OTHER PUBLICATIONS

Allis, R., et al., "Best Practices for Email Marketers," Aug. 2005, pp. 1-31, IntelliContact Pro, Broadwick Corp., URL: http://www.icontact.com/static/pdf/Email_Marketing_Best_Practices_iContact.pdf.

(Continued)

*Primary Examiner* — Ganiyu A Hanidu
(74) *Attorney, Agent, or Firm* — Edward J. Lenart; Katherine S. Brown; Kennedy Lenart Spraggins LLP

(57) ABSTRACT

Methods, apparatus, and products for managing service subscriptions of a plurality of devices over a unidirectional transmission channel, including: assigning, by a subscription management module, one or more group identifiers to a device to be activated for a service subscription, each group identifier being an identification of a group of devices having an activated subscription to the service; activating, by the subscription management module, the device's service subscription including broadcasting an activation message that includes a unique identifier of the device, the assigned group identifiers, and an active subscription period being a period of time during which the device's subscription to the service is to be active; and prior to expiration of the active subscription period, broadcasting a reactivation message including at least one of the group identifiers to which the device is assigned.

17 Claims, 5 Drawing Sheets

(56) References Cited

U.S. PATENT DOCUMENTS

| | | |
|---|---|---|
| 2006/0223499 A1 | 10/2006 | Pecen et al. |
| 2007/0192805 A1 | 8/2007 | Dutta et al. |
| 2008/0109470 A1 | 5/2008 | McGee |
| 2010/0107186 A1 | 4/2010 | Varriale et al. |
| 2011/0093930 A1* | 4/2011 | Bartel-Kurz et al. ............. 726/4 |
| 2011/0201365 A1* | 8/2011 | Segura ........................ 455/466 |
| 2012/0203822 A1* | 8/2012 | Floyd et al. .................. 709/203 |

OTHER PUBLICATIONS

Goldberg, J., et al., "Network structures—the internet, IPTV and QoE," European Broadcasting Union (EBU) Technical Review Online (www.ebu.ch), Oct. 2007, pp. 45-53, [accessed Mar. 3, 2013], URL: http://tech.ebu.ch/docs/techreview/trev_312-kernen_QoE.pdf.

Wikipedia, "Multicast", (online), accessed Jan. 16, 2013, 5 pages, URL: http://en.wikipedia.org/wiki/Multicast.

McMillan, R., "Bug Allowed Free Access to Sirius Radio Service", PCWorld.com (online), Nov. 24, 2008, [accessed Jan. 16, 2013], 3 pages, URL: http://www.pcworld.com/article/154440/article.html.

Control Vision Corporation, "The XM Activation Process", controlvision.com (online) 2004, [accessed Mar. 26, 2013], 2 pages, URL: http://docs.controlvision.com/pages/xm_act.php.

* cited by examiner

MANAGING SERVICE SUBSCRIPTIONS OVER A UNIDIRECTIONAL TRANSMISSION CHANNEL

BACKGROUND OF THE INVENTION

1. Field of the Invention

The field of the invention is data processing, or, more specifically, methods, apparatus, and products for managing service subscriptions of a number of devices over a unidirectional transmission channel.

2. Description of Related Art

Some subscription broadcast mechanisms, like satellite radio, require activation codes to be sent to receivers in a unidirectional transmission channel such that all receivers receive the activation codes even if the receiver is not the subject of the activation code. Reactivation codes are sent in a similar manner, one message per receiver broadcast to all receivers regardless of the intended target. As the number of receivers increases, the bandwidth required to broadcast activation and reactivation codes to all of the receivers increases significantly.

SUMMARY OF THE INVENTION

Methods, apparatus, and products for managing service subscriptions of a plurality of devices over a unidirectional transmission channel are described in this specification. Such management includes: assigning, by a subscription management module, one or more group identifiers to a device to be activated for a service subscription, each group identifier being an identification of a group of devices having an activated subscription to the service; activating, by the subscription management module, the device's service subscription including broadcasting an activation message that includes a unique identifier of the device, the assigned group identifiers, and an active subscription period being a period of time during which the device's subscription to the service is to be active; and prior to expiration of the active subscription period, broadcasting a reactivation message including at least one of the group identifiers to which the device is assigned.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
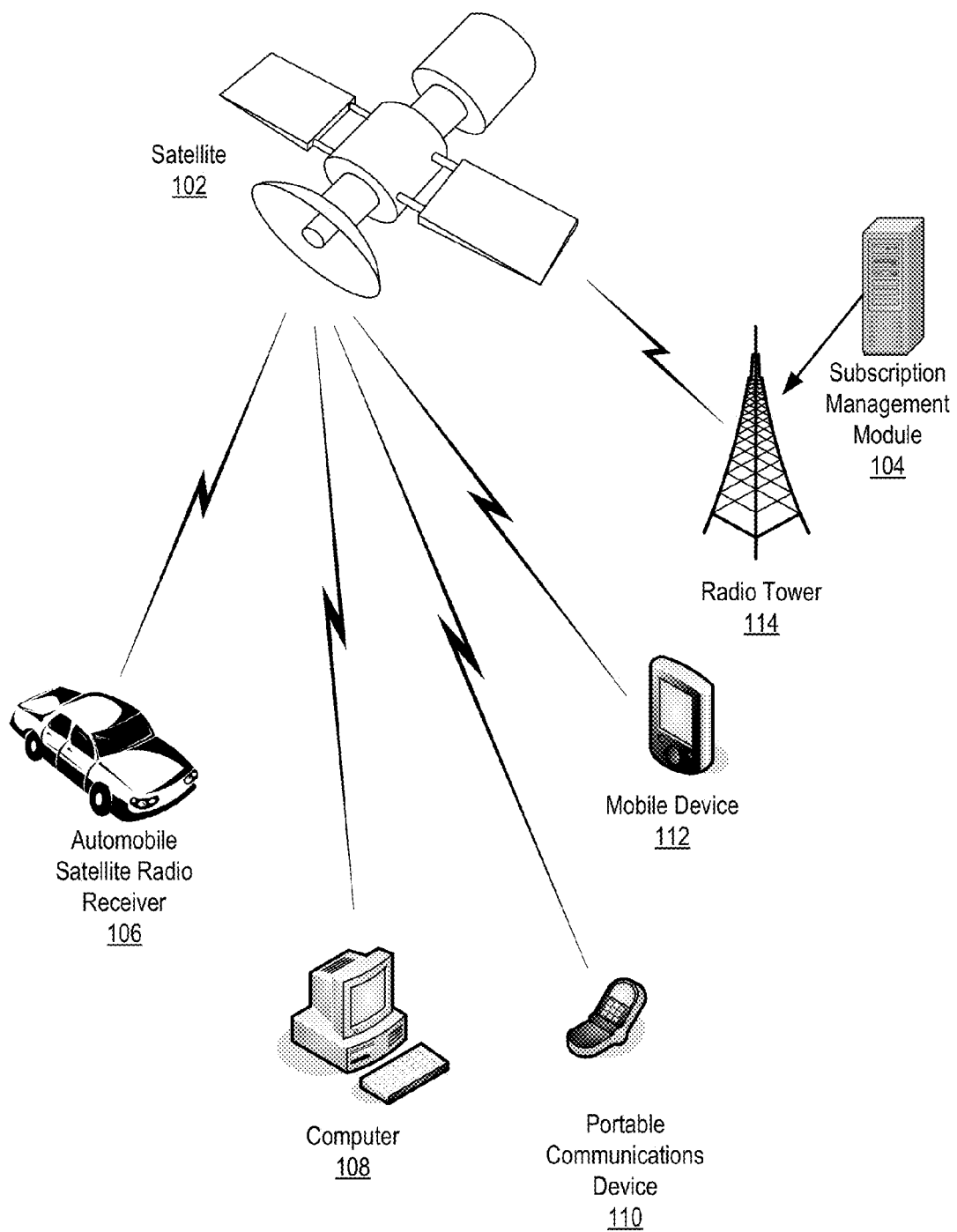
FIG. 1 sets forth a network diagram of a system for managing service subscriptions of a number of devices over a unidirectional transmission channel according to embodiments of the present invention.

Exemplary methods, apparatus, and products for managing service subscriptions of a number of devices over a unidirectional transmission channel in accordance with the present invention are described with reference to the accompanying drawings, beginning with FIG. 1. FIG. 1 sets forth a network diagram of a system for managing service subscriptions of a number of devices over a unidirectional transmission channel according to embodiments of the present invention. The term 'unidirectional transmission channel' refers to any data communications channel in which data is transmitted in a single direction, from source to target. Such unidirectional transmission channels are often utilized to activate and renew service subscriptions for devices. Examples of such service subscriptions include satellite radio subscriptions, software service subscriptions for licensing or online gaming accounts, and the like.

The system of FIG. 1 includes an example unidirectional transmission channel in the form of a satellite (102) radio system. The system of FIG. 1 includes a subscription management module (104), a module of automated computing machinery configured for managing service subscriptions of a number of devices over a unidirectional transmission channel in accordance with the present invention. Generally, the subscription management module (104) transmits activation and reactivation (renewal) message through a radio tower (114) to a satellite (102). The satellite, in turn, broadcasts each message to devices configured to receive such messages. In this example, such devices include an automobile satellite radio receiver (106), a computer (108), a portable communications device (110), and a mobile device (112).

An activation message operates to notify a device that the device's subscription to a service has been activated and the device may provide functionality related to the service. A reactivation message operates to inform the device that the device's subscription has been renewed and service may continue to be provided. In the example unidirectional transmission system of FIG. 1, each activation and reactivation message is broadcast to all devices—even if the device is not the subject of the message. That is, an activation message intended for the automobile satellite radio receiver (106) is broadcast to all of the example devices in parallel. In the same way, a reactivation message intended only for the automobile satellite radio receiver (106) is also broadcast to all of the example devices.

In prior art systems, a renewal of a service subscription for a device resulted in a separate reactivation message being transmitted to all devices. In order to reactivate four devices in a prior art system, for example, four separate reactivation message are transmitted to all devices. In this way, the system transmits sixteen message, four per reactivation. Further, because the system operations with a unidirectional channel, there is no feedback from the devices indicating whether the message was received. To that end, systems in the prior art will occasionally rebroadcast the same reactivation message periodically a number of times. Such prior art systems do not scale well. Consider, for example, a prior art system in which 100,000 devices are reactivated. In such a prior art system, 100,000 separate reactivation messages are broadcast, resulting in 10 million messages that are transmitted along the unidirectional transmission channel to effect the reactivation of the 100,000 devices. If each reactivation message is then retransmitted just one more time to ensure that the devices actually receive the reactivation message, the number of messages carried on the unidirectional transmission channel increases to 20 million to effect the reactivation of the 100,000 devices.

The subscription management module (104) in the example of FIG. 1, however, is configured for managing service subscriptions of a number of devices over a unidirectional transmission channel in accordance with the present invention by assigning one or more group identifiers to a device to be activated for a service subscription. Each group identifier is an identification of a group of devices having an activated subscription to the service. The subscription management module (104) then activates the device's service subscription by broadcasting an activation message that includes a unique identifier of the device, the assigned group identifiers, and an active subscription period comprising a period of time during which the device's subscription to the service is to be active.

Then, prior to expiration of the active subscription period and after receiving renewal requests for a number of devices assigned to a group identifier, the subscription service module broadcasts a reactivation message that includes at least one of the group identifiers to which the device is assigned. In this way, a single reactivation message may be broadcast (to all devices in the system) to reactivate the service subscription for multiple devices. Consider, for example, that the four devices in the system of FIG. 1 are all assigned the same group identifier. Rather than broadcasting one reactivation message for each device separately, the subscription management module (104) of FIG. 1 may broadcast a single reactivation message using the group identifier assigned to all four of the devices. In this way, a single reactivation message results in only four messages being carried along the unidirectional transmission channel to effect the reactivation of four devices. In contrast, a prior art system would broadcast a single reactivation message for each device, thus resulting in a total of sixteen message transmitted along the unidirectional transmission channel to effect reactivation of the same four devices.

Once a device (106, 108, 110, 112) receives a reactivation message, the device determines whether at least one of the group identifiers included in the reactivation message is assigned to the device. If not, the device ignores the message. If at least one of the group identifiers included in the reactivation message is assigned to the device, however, the device reactivates the service subscription for a reactivation period. The reactivation period may be specified in the reactivation message itself or may be a default time period such as, for example, one year.

The arrangement of devices, modules, towers, and satellites making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Managing service subscriptions of a number of devices over a unidirectional transmission channel in accordance with the present invention is generally implemented with computers, that is, with automated computing machinery. In the system of FIG. 1, for example, each of devices (106, 108, 110, 112), the satellite (102), and the subscription management module (104) may be implemented to some extent as computers. For further explanation, therefore, FIG. 2 sets forth a block diagram of automated computing machinery comprising an exemplary computer (152) useful in managing service subscriptions of a number of devices over a unidirectional transmission channel according to embodiments of the present invention. The computer (152) of FIG. 2 includes at least one computer processor (156) or 'CPU' as well as random access memory (168) (RAM') which is connected through a high speed memory bus (166) and bus adapter (158) to processor (156) and to other components of the computer (152).

Stored in RAM (168) is a subscription management module (104), a module of computer program instructions that, when executed causes the computer (152) to managing service subscriptions of a number of devices over a unidirectional transmission channel in accordance with the present invention. The subscription management module (104) of FIG. 2 may carry out such management by assigning one or more group identifiers (202) to a particular device—one of the devices (182)—to be activated for a service subscription. Each group identifier is an identification of a group of devices having an activated subscription to the service.

The subscription management module may then activate the particular device's (182) service subscription by broadcasting an activation message (206) that includes a unique identifier of the particular device (204), the assigned group identifiers (202), and an active subscription period (210). The active subscription period is a period of time during which the particular device's subscription to the service is to be active.

Then, prior to expiration of the active subscription period and after receiving a renewal request from all devices assigned one of the group identifiers (202) that is also assigned to the particular device, the subscription management module (104) may broadcast a reactivation message (208) that includes at least one of the group identifiers (202) assigned to the particular device.

Also stored in RAM (168) is an operating system (154). Operating systems useful managing service subscriptions of a number of devices over a unidirectional transmission channel according to embodiments of the present invention include UNIX™ Linux™ Microsoft XP™ AIX™ IBM's i5/OS™ and others as will occur to those of skill in the art. The operating system (154), subscription management module (104), group identifiers (202), device identifiers (204), activation and reactivation messages (206, 208), and the subscription period (210) in the example of FIG. 2 are shown in RAM (168), but many components of such software typically are stored in non-volatile memory also, such as, for example, on a disk drive (170).

Figure 2:
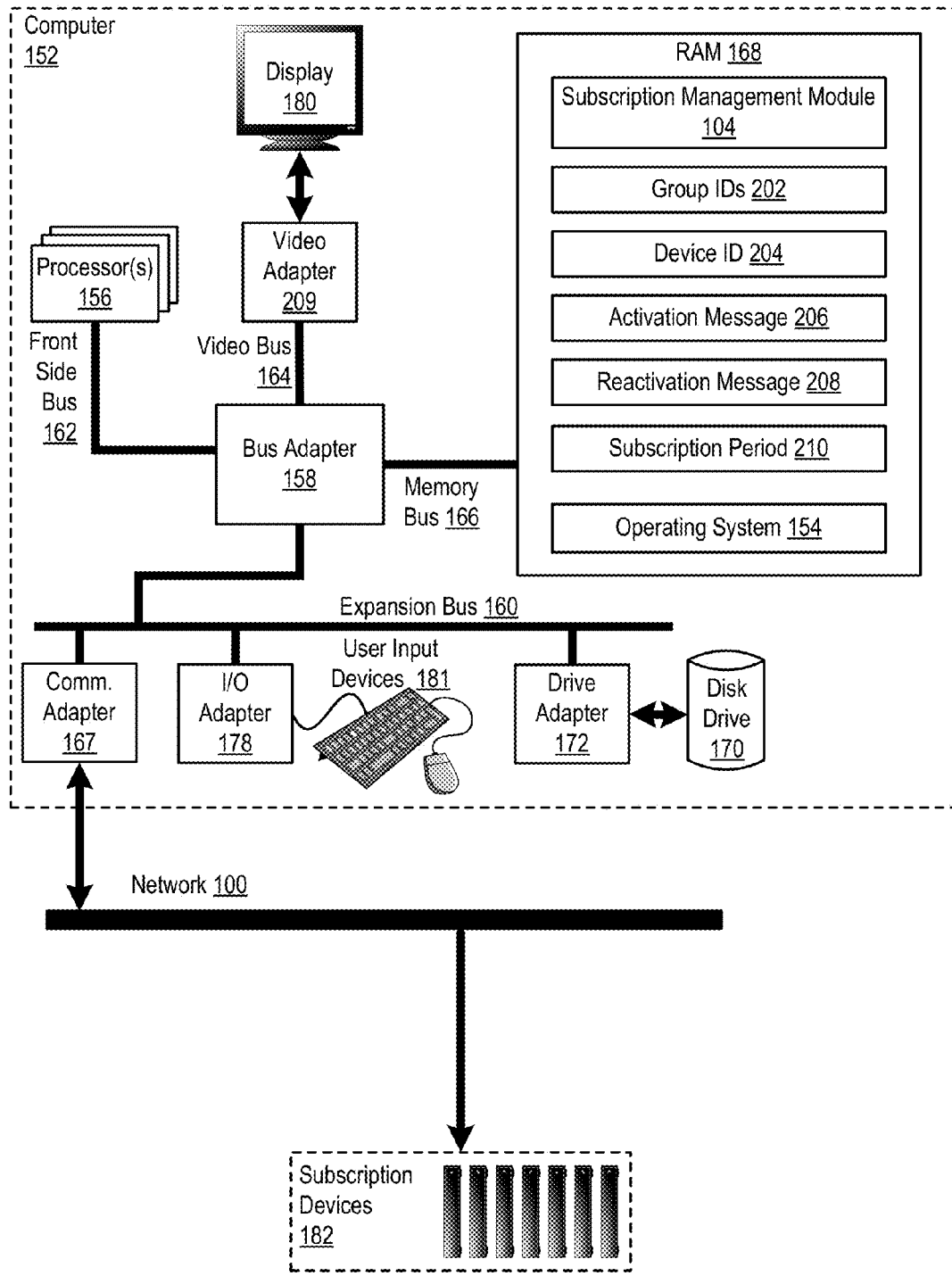
FIG. 2 sets forth a block diagram of automated computing machinery comprising an exemplary computer useful in managing service subscriptions of a number of devices over a unidirectional transmission channel according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for managing service subscriptions of a number of devices over a unidirectional transmission channel according to embodiments of the present invention include Integrated Drive Electronics ('IDE') adapters, Small Computer System Interface ('SCSI') adapters, and others as will occur to those of skill in the art.

Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers and devices (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing service subscriptions of a number of devices over a unidirectional transmission channel according to embodiments of the present invention include modems for wired dial-up communications, Ethernet (IEEE 802.3) adapters for wired data communications, and 802.11 adapters for wireless data communications.

Figure 3:
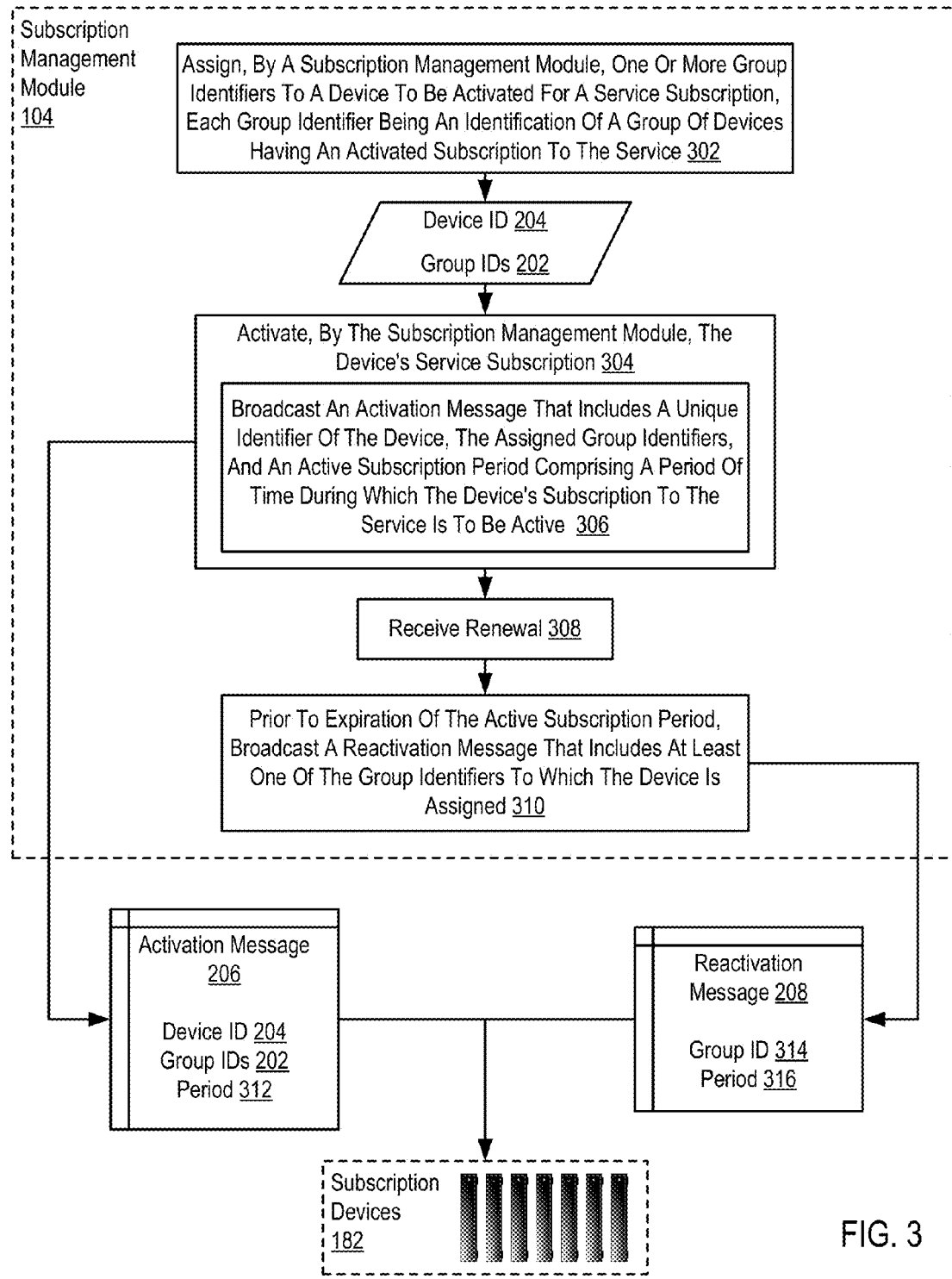
FIG. 3 sets forth a flow chart illustrating an exemplary method for managing service subscriptions of a number of devices over a unidirectional transmission channel according to embodiments of the present invention.

For further explanation, FIG. 3 sets forth a flow chart illustrating an exemplary method for managing service subscriptions of a number of devices over a unidirectional transmission channel according to embodiments of the present invention. The method of FIG. 3 includes assigning (302), by a subscription management module (104), one or more group identifiers to a device (182) to be activated for a service subscription. Each group identifier includes an identification of a group of devices having an activated subscription to the service. Assigning (302) one or more group identifiers to a device (182) to be activated for a service subscription may be carried out by establishing a data structure for each of the group identifiers and including in the data structure unique device identifiers of each device to which the group identifier is assigned.

The method of FIG. 3 also includes activating (304), by the subscription management module (104), the device's service subscription. In the example of FIG. 3, activating (304) the device's service subscription includes broadcasting (306) an activation message (206) that includes a unique identifier (204) of the device, the assigned group identifiers (202), and an active subscription period (312).

The active service subscription period (312) is a period of time during which the device's subscription to the service is to be active. Broadcasting the activation message may be carried out through one or more data communications messages (packets, frames, etc.) via the unidirectional transmission channel.

The method of FIG. 3 also includes receiving (308) a renewal request from each device assigned one of the group identifiers that is also assigned to the device mentioned above. Then, prior to expiration of the active subscription period, the method of FIG. 3 continues by broadcasting (310) a reactivation message (208) to all devices (182) via the unidirectional transmission channel. The reactivation message (208) includes at least one of the group identifiers (314) assigned do the device. The reactivation message (316) may also include a reactivation period (316).

Figure 4:
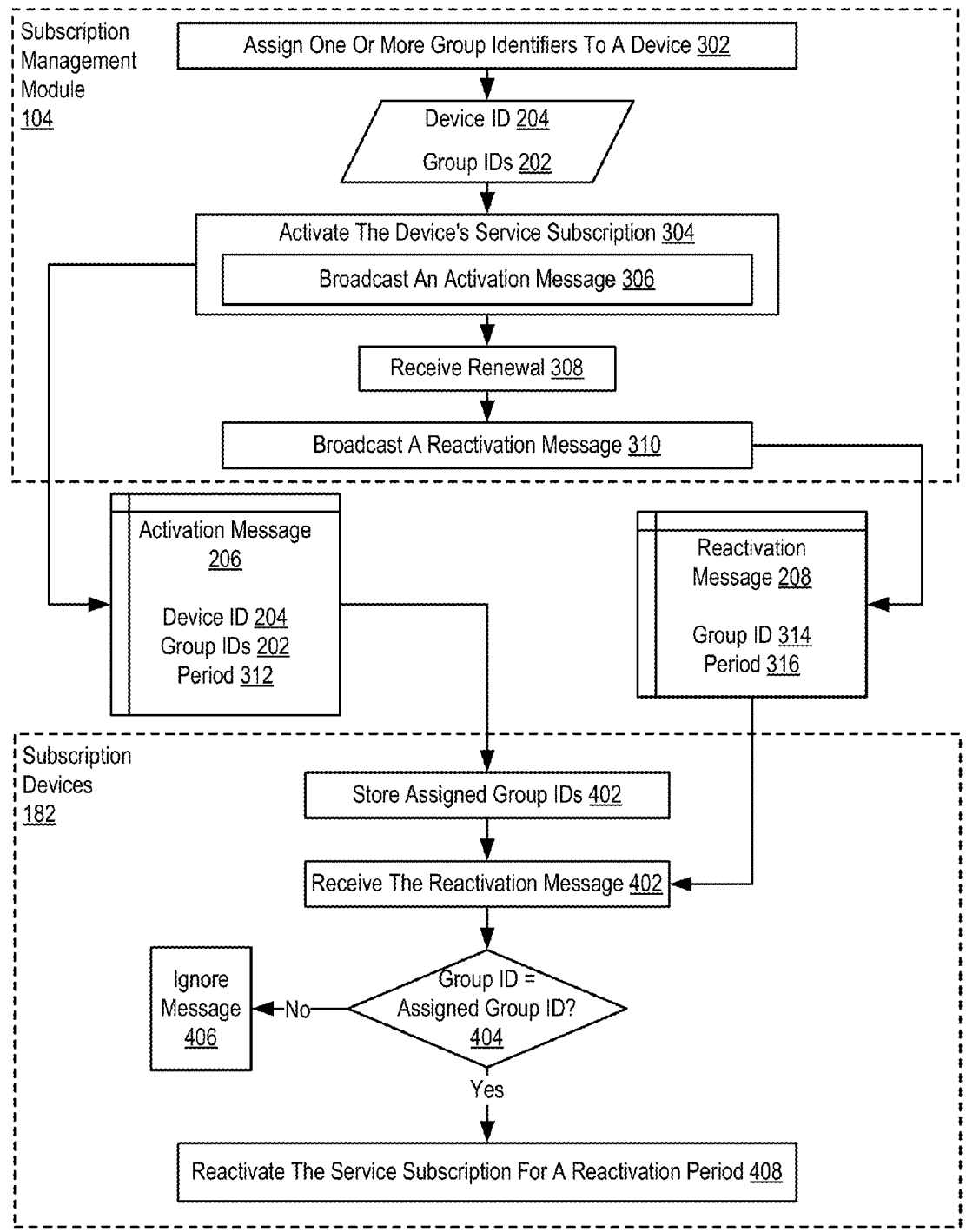
FIG. 4 sets forth a flow chart illustrating a further exemplary method for managing service subscriptions of a number of devices over a unidirectional transmission channel according to embodiments of the present invention.

For further explanation, FIG. 4 sets forth a flow chart illustrating a further exemplary method for managing service subscriptions of a number of devices over a unidirectional transmission channel according to embodiments of the present invention. The method of FIG. 4 is similar to the method of FIG. 3 in that the method of FIG. 4 also includes assigning (302) one or more group identifiers to a device (182) to be activated for a service subscription; activating (304) the device's service subscription by broadcasting (306) an activation message (206); receiving (308) a renewal request from each device assigned one of the group identifiers; and broadcasting (310) a reactivation message (208) to all devices (182).

The method of FIG. 4 differs from the method of FIG. 3, however, in that the method of FIG. 4 also includes storing (402), by the device, the assigned group identifiers and, later, receiving (402), by the device, the reactivation message.

The method of FIG. 4 continues by determining (404) whether at least one of the group identifiers included in the reactivation message is assigned to the device. Determining (404) whether at least one of the group identifiers included in the reactivation message is assigned to the device may be carried out by comparing the group identifier (314) included in the reactivation message (208) to the assigned group identifiers previously stored (402) by the device.

If at least one of the group identifiers included in the reactivation message is not assigned to the device, the method of FIG. 4 continues by ignoring (406) the reactivation message. If, however, at least one of the group identifiers (314) included in the reactivation message (208) is assigned to the device (182), the method of FIG. 4 continues by reactivating (408) the service subscription for a reactivation period.

In some embodiments, the reactivation period may be specified in the reactivation message (208) as in the example of FIG. 4, or in other embodiments, may be a default, predefined period of time. Also in some embodiments, the reactivation message (208) may also include additional group identifier assignments for the device. That is, the reactivation message may be utilized by the subscription management module (104) to provide additional group identifier assignments to the devices being reactivated by the reactivation message.

Figure 5:
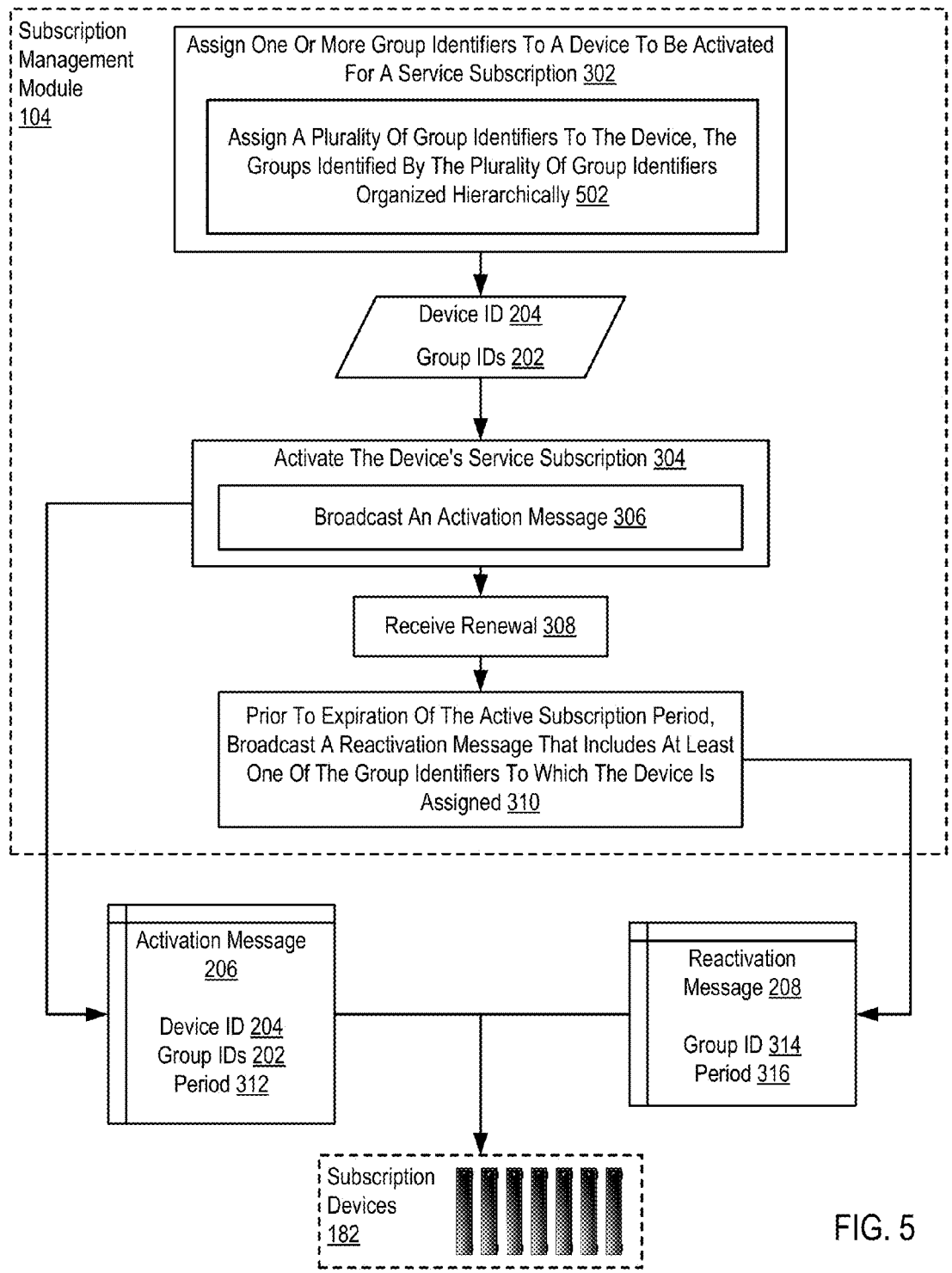
FIG. 5 sets forth a flow chart illustrating a further exemplary method for managing service subscriptions of a number of devices over a unidirectional transmission channel according to embodiments of the present invention.

For further explanation, FIG. 5 sets forth a flow chart illustrating a further exemplary method for managing service subscriptions of a number of devices over a unidirectional transmission channel according to embodiments of the present invention. The method of FIG. 5 is similar to the method of FIG. 3 in that the method of FIG. 5 also includes assigning (302) one or more group identifiers to a device (182) to be activated for a service subscription; activating (304) the device's service subscription by broadcasting (306) an activation message (206); receiving (308) a renewal request from each device assigned one of the group identifiers; and broadcasting (310) a reactivation message (208) to all devices (182).

The method of FIG. 5 differs from the method of FIG. 3, however, in that in the method of FIG. 5, assigning (302) one or more group identifiers to the device is carried out by assigning (502) a plurality of group identifiers to the device.

Further, the groups identified by the plurality of group identifiers are organized in hierarchical categories. Each different category may correspond to a subscription stability. The term 'subscription stability' here refers to the likelihood of renewal by a subscriber to a service. The more likely the renewal, the greater the subscription stability. Consider age of a subscription as one example a factor that may be indicative of subscription stability. A subscription that has been active and renewed for ten years may is more likely to be renewed at the subsequent renewal period than a subscription that has is only a few months old.

Each of the categories may be defined or specified by any number of subscription-related characteristics or factors. Examples of such subscription-related characteristics include: age of active subscription; demographic of subscriber; subscription type attributes; customer satisfaction survey results; and frequency of subscriber contacting customer support.

The categories of group identifiers may be organized hierarchically so that the most 'stable' subscriptions are assigned to the largest possible group while less stable subscriptions are assigned to smaller groups. Consider an example: if receiver 97 is a member (along with several hundred other receivers) of group 10589 and group 10589 is a hierarchical member (along with group 20471 and several dozen other groups) of parent group 68884, then a reactivation message to group 68884 will reactive several thousand receivers at once—the receivers of group 20471, receivers of group 10589, and the receivers of the other groups included in parent group 68884. If a receiver in group 20471 fails to renew, however, then instead of reactivating parent group 68884, the subscription management module may reactivate group 10589 and dozens of other groups, while reactivating receivers in the affected group 20471 individually. Further, the subscription management module may then reassign groups for all reactivated receivers representing the loss of group 20471.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:

assigning, by a subscription management module, a plurality of group identifiers to a device to be activated for a service subscription, each group identifier comprising an identification of a group of devices having an activated subscription to the service, the groups identified by the plurality of group identifiers organized in hierarchical categories, wherein the hierarchical categories correspond to subscription stability indicating the likelihood of renewal of a subscriber to the service;

activating, by the subscription management module, the device's service subscription including broadcasting an activation message that includes a unique identifier of the device, the assigned group identifiers, and an active subscription period comprising a period of time during which the device's subscription to the service is to be active; and prior to expiration of the active subscription period, broadcasting a reactivation message comprising at least one of the group identifiers assigned do the device.

2. The method of claim 1 further comprising:

receiving, by the device, the reactivation message;

determining whether at least one of the group identifiers included in the reactivation message is assigned to the device; and if at least one of the group identifiers included in the reactivation message is assigned to the device, reactivating the service subscription for a reactivation period.

3. The method of claim 1 wherein the reactivation message further comprises additional group identifier assignments for the device.

4. The method of claim 1 wherein each group identified by a group identifier is categorized in dependence upon one or more subscription-related characteristics including any of:

age of active subscription;

demographic of subscriber;

subscription type attributes;

customer satisfaction survey results; and frequency of subscriber contacting customer support.

5. The method of claim 1 wherein the service subscription comprises a satellite radio service subscription.

6. The method of claim 1 wherein the service subscription comprises a software service subscription.

7. An apparatus comprising a computer processor, a computer memory operatively coupled to the computer processor, the computer memory having disposed within it computer program instructions that, when executed by the computer processor, cause the apparatus to carry out the steps of:

assigning, by a subscription management module, a plurality of group identifiers to a device to be activated for a service subscription, each group identifier comprising an identification of a group of devices having an activated subscription to the service, the groups identified by the plurality of group identifiers organized in hierarchical categories, wherein the hierarchical categories correspond to subscription stability indicating the likelihood of renewal of a subscriber to the service;

activating, by the subscription management module, the device's service subscription including broadcasting an activation message that includes a unique identifier of the device, the assigned group identifiers, and an active subscription period comprising a period of time during which the device's subscription to the service is to be active; and prior to expiration of the active subscription period, broadcasting a reactivation message comprising at least one of the group identifiers assigned do the device.

8. The apparatus of claim 7 further comprising computer program instructions that, when executed, cause the apparatus to carry out the steps of:

receiving, by the device, the reactivation message;

determining whether at least one of the group identifiers included in the reactivation message is assigned to the device; and if at least one of the group identifiers included in the reactivation message is assigned to the device, reactivating the service subscription for a reactivation period.

9. The apparatus of claim 7 wherein the reactivation message further comprises additional group identifier assignments for the device.

10. The apparatus of claim 7 wherein each group identified by a group identifier is categorized in dependence upon one or more subscription-related characteristics including any of:

age of active subscription;

demographic of subscriber;

subscription type attributes;

customer satisfaction survey results; and frequency of subscriber contacting customer support.

11. The apparatus of claim 7 wherein the service subscription comprises a satellite radio service subscription.

12. The apparatus of claim 7 wherein the service subscription comprises a software service subscription.

13. A computer program product disposed upon a non-transitory computer readable medium, the computer program product comprising computer program instructions that, when executed, cause a computer to carry out the steps of:

assigning, by a subscription management module, a plurality of group identifiers to a device to be activated for a service subscription, each group identifier comprising an identification of a group of devices having an activated subscription to the service, the groups identified by the plurality of group identifiers organized in hierarchical categories, wherein the hierarchical categories correspond to subscription stability indicating the likelihood of renewal of a subscriber to the service;

activating, by the subscription management module, the device's service subscription including broadcasting an activation message that includes a unique identifier of the device, the assigned group identifiers, and an active subscription period comprising a period of time during which the device's subscription to the service is to be active; and prior to expiration of the active subscription period, broadcasting a reactivation message comprising at least one of the group identifiers assigned do the device.

14. The computer program product of claim 13 further comprising computer program instructions that, when executed, cause the computer to carry out the steps of:

receiving, by the device, the reactivation message;

determining whether at least one of the group identifiers included in the reactivation message is assigned to the device; and if at least one of the group identifiers included in the reactivation message is assigned to the device, reactivating the service subscription for a reactivation period.

15. The computer program product of claim 13 wherein the reactivation message further comprises additional group identifier assignments for the device.

16. The computer program product of claim 13 wherein each group identified by a group identifier is categorized in dependence upon one or more subscription-related characteristics including any of:

age of active subscription;
demographic of subscriber;
subscription type attributes;
customer satisfaction survey results; and
frequency of subscriber contacting customer support.

17. The computer program product of claim 13 wherein the service subscription comprises a satellite radio service subscription.

* * * * *